United States Patent [19]

Gonzalez

[11] 4,131,434
[45] Dec. 26, 1978

[54] CATALYTIC COMPOSITION FOR INTERNAL COMBUSTION ENGINES, FURNACES AND BOILERS

[76] Inventor: Francisco Gonzalez, Juan Cordero 27, Circuito Pintores, Ciudad Satelite, Mexico

[21] Appl. No.: 726,317

[22] Filed: Sep. 24, 1976

Related U.S. Application Data

[63] Continuation-in-part of Ser. No. 560,893, Mar. 21, 1975, abandoned.

[30] Foreign Application Priority Data

Jun. 3, 1974 [MX] Mexico ................................. 151431

[51] Int. Cl.² ............................................. C10L 1/22
[52] U.S. Cl. ........................................... 44/62; 44/77; 44/80
[58] Field of Search ......................... 44/62, 77, 80, 57

[56] References Cited

U.S. PATENT DOCUMENTS

| 53,709 | 4/1866 | Vaughan | 44/62 |
|---|---|---|---|
| 1,399,227 | 12/1921 | Rohrs | 44/77 |
| 1,423,049 | 7/1922 | Tunison | 44/77 |
| 1,557,257 | 10/1925 | Riboisiere | 44/77 |
| 1,814,745 | 7/1931 | Elliott | 44/80 |
| 2,106,661 | 1/1938 | Savage | 44/77 |
| 2,402,863 | 6/1946 | Zuidema | 44/62 |
| 3,434,814 | 3/1969 | Dubeck et al. | 44/57 |

*Primary Examiner*—Winston A. Douglas
*Assistant Examiner*—Y. Harris-Smith
*Attorney, Agent, or Firm*—Ladas, Parry, Von Gehr, Goldsmith & Deschamps

[57] ABSTRACT

A petroleum derived fuel composition of oil, diesel oil and gasoline including catalyst additive composition to improve the fuel efficiency and to reduce their air polluting effects. The composition includes aromatic and aliphatic hydrocarbon solvents with and without oxygenated functional groups, terpenes and aromatic nitrogen containing compounds.

The present invention relates to additives for use with petroleum based fuels.

8 Claims, No Drawings

CATALYTIC COMPOSITION FOR INTERNAL COMBUSTION ENGINES, FURNACES AND BOILERS

CROSS REFERENCE TO RELATED APPLICATIONS

This application is a continuation in part application to my co-pending application Ser. No. 560,893 filed on Mar. 21, 1975, now abandoned.

OBJECTS OF THE INVENTION

As suggested above, an object of the invention is to provide a chemical mixture that when added to combustion fuels it improves the combustion properties of the latter.

Another object of the invention is to provide a combustion fuel additive that is effective when utilized in minute quantities.

A further object of the invention consists is that by using the additive involved in minute amounts the fuel properties improve by attaining a higher mileage per gallon.

A further object of the invention consists in that by using the additive involved in minute amounts the fuel properties improve by attaining a higher mileage per gallon (or kilometer per liter) ratio in vehicles.

A still further object of the invention is to provide a combustion fuel micro additive that checks or reduces its pollution effects.

These and other objects of the invention will be evident from the content of the following specification and appended claims.

SUMMARY OF THE INVENTION

Accordingly, the invention provides an additive composition for use with a petroleum derived fuel comprising aromatic hydrocarbons optionally substituted with one or two methyl groups, diesel oil, a terpene and a lower alkyl ketone. Optionally, it may also contain liquid vaseline and a carbocyclic aromatic nitrogen compound such as aniline or nitrobenzene. Such as additive may be employed in amounts of up to 0.2% by volume based on the volume of fuel.

More particularly it provides an additive which comprises:
From 12.8 to 5.6% by volume diesel;
From 6 to 20% by volume of bicyclic terpene such as pinene;
From 12 to 25% by volume of at least one of benzene, toluene or xylene;
From 12 to 25% by volume of methyl ethyl ketone or acetone;
From 0 to 16% by volume of liquid vaseline;
From 0 to 13.5% by volume of aniline;
from 0 to 15% by volume of nitrobenzene;
and from 2.2 to 3.1 Kg. of naphthalene per 100 liters of the above.

Preferably, the naphthalene may be employed in the form of "solution N" which is a composition of 15 kg. naphthalene flakes per 43 liters of diesel. If this "solution N" is employed, a suitable adjustment to the amount of diesel otherwise added should be made.

The invention refers to improvements in catalyzing additives of the hydrocarbon type for liquid fuels derived from petroleum, and to the process for their preparation.

These catalyzing additives are active colloidal suspensions with brownian movement, subject to total combustion at the same temperature as the fuels; because of their catalyzing effect they have as a fundamental property the reduction of the surface tension and viscosity of fuels, giving them a more homogeneous molecular structure which makes possible the fuller and more efficient use of the heat content of the fuels, besides improving their cetane and octane number.

|  | Surface tension dynes/cm | Viscosity at 25° C Centistokes | Saybolt |
|---|---|---|---|
| Diesel without additive | 38.4 ± 0.2 | 517 | 42.9 |
| Diesel with additive: Proportion: | | | |
| 1/5000 | 28.5 | 516 | 42.9 |
| 1/2500 | 28.4 ± 0.2 | 513 | 42.8 |
| 1/1000 | 28.4 ± 0.1 | 512 | |
| 1/500 | 28.4 ± 0.01 | 511 | |

With these data which are the average of three determinations it is concluded that there is no significant change in the surface tension when the additive is present in any concentration above 1/500; furthermore the reduction in viscosity is appreciable above the level of 1/2500, although quantities of additive above 1/500 cause a very small reduction in viscosity; hence it is determined that the most suitable proportion of additive to add to diesel is 1/500.

|  | Surface Tension dynes/cm | Viscosity at 25° C Centistokes |
|---|---|---|
| Gasoline without additive | 22.3 ± 0.1 | 0.566 ± 0.001 |
| Gasoline with additive: Proportion: | | |
| 1/5000 | 22.1 | 0.566 ± 0.001 |
| 1/2500 | 21.7 ± 0.1 | 0.566 ± 0.001 |
| 1/1000 | 21.5 ± 0.1 | 0.560 ± 0.001 |
| 1/500 | 21.0 ± 0.1 | 0.555 ± 0.001 |

With these data which are the average of three determinations, it is found that the greatest reduction in surface tension is obtained with an additive concentration of 1/500, and in viscosity the proportions of 1/1000 and 1/500 cause an appreciable reduction accordingly the most adivisable proportion is taken to be 1/500.

|  | | Surface Tension dynes/cm | Viscosity at 25° C | | |
|---|---|---|---|---|---|
|  | | | a) | b) | c) |
| Fuel oil for boilers & furnaces without additive: | | 32.1 ± 0.1 | 816 | 889 392 887 | 4120 |
| Fuel oil for boilers & furnaces with additive: | | | | | |
| Proportion: | 1/500 | 31.9 | 800 | 871 875 866 | 4034 |
|  | 1/2500 | 31.4 | 720 | 780 | 3631 | a) = centipoises
b) = centistokes
c) = Saybolt

Examination of these data shows an appreciable reduction in surface tension and viscosity when the additive is put in a concentration of 1/1000.

Interpretation of the foregoing data can be summed up as follows.

Diesel fuel. - There is no appreciable effect upon surface tension; viscosity is reduced; the most suitable proportion for adding the additive is 1/500.

Gasoline. - Surface tension is reduced and viscosity is reduced when the additive is added in the proportion of 1/1000 or more, the most suitable concentration being 1/500.

Fuel oil for boilers, furnaces, etc. - Reduces surface tension and viscosity when additive is added in the proportion of 1/1000.

After the tests carried out is Analytical Research Laboratories Inc., of Monrovia, California, actual physical runs were undertaken to evaluate the increased yield in fuels and their improved performance produced by the catalyzing additives of the present application, with the results indicated below.

| Route | Distance (Kilometers) | Fuel Consumption (Liters) | Kilometers per liter of Fuel |
|---|---|---|---|
| DIESEL FUEL WITHOUT ADDITIVE | | | |
| Mexico-Veracruz | 446 | 205 | |
| Veracruz-Mexico | 446 | 218 | |
| Round trip | 892 | 423 | 2.108 |
| DIESEL FUEL WITH ADDITIVE | | | |
| Mexico-Veracruz | 446 | 141 | |
| Veracruz-Mexico | 446 | 165 | |
| Round trip | 892 | 306 | 2.915 |

These data show that consumption went down from 413 to 306 liters, that is to say 26.1%; hence the combustion efficiency increasing from 2.108 to 2.915 Kilometers per liter, went up by 38%.

| Route | Distance (Kilometers) | Fuel Consumption (Liters) | Kilometers per Liter of fuel |
|---|---|---|---|
| DIESEL FUEL WITHOUT ADDITIVE | | | |
| Mexico-Jalapa | 333 | 153 | |
| Jalapa-Mexico | 333 | 162 | |
| Round trip | 666 | 315 | 2.114 |
| DIESEL FUEL WITH ADDITIVE | | | |
| Mexico-Jalapa | 333 | 105 | |
| Jalapa-Mexico | 333 | 123 | |
| Round Trip | 666 | 228 | 2.929 |

From these data it is evident that the consumption diminished from 315 to 228 liters, that is by 30.7%; hence fuel efficiency, increasing from 2.114 to 2.929 Kilometers per liter, went up by 27.8%.

It must be pointed out that the foregoing tests were carried out in buses on fixed routes.

For the above runs the additive was added to the diesel fuel in a ratio of 1 part additive to 500 parts diesel fuel because of the test results of Table B. The additive formulation was prepared by using the ingredients given below in the amounts stated in Table A so as to make a total volume of 100 liters of the additive formulation.

TABLE A

| COMPOUNDS | Catalytic ACTIVATOR FORMULATION, "D" for diesel |
|---|---|
| Solution "N" | 10.4 Kgs. (8 Lts. Containing 2.2 Kgs. Naphthalene) |
| Diesel fuel No. 2 (Like carrier) | 31.0 l. |
| Terpene Bicyclic compounds ($C_{10}H_{16}$) Pinene | 10.0 l. |
| Benzene ($C_6H_6$) | 18.0 l. |
| Methyl Ethyl Ketone ($CH_3CCC_2H_5$) | 18.0 l. |
| Liquid Vaseline | 10.0 l. |
| Nitrobenzene ($C_6H_5NO_2$) | 5.0 l. |
| | 100.0 l. |

TABLE A-continued

Solution "N" = $\frac{15 \text{ Kg Naphthalene}}{43 \text{ l. Diesel No. 2}}$ amounting to a 55 l. volume.

DIESEL ADDITIVE FORMULATION SPECIFICATIONS

| | |
|---|---|
| Density At 77° F | 0.8560 |
| Ref Reactive Index at 77° F | 1.4836 |
| Viscosity at 77° F. SSU | 31 |
| Flash Point, ° F | 35.6 |
| Fire Point, ° F | 46.4 |
| Calorific Value, BTU/lb | 17190 |
| a) Ash Percent (1) | 0.004 |
| b) Acid Number (2) | 0.08 |
| c) Lead (Pb,ppm) (3) | 0.2 |

1) Burned at 800° C (1472 ° F)
2) Acid number determined by Astm Method-Acid number units are milligrams KOH per gram
3) Lead determined by atomic absorption spectrophotometry units are parts per million (ppm)

TABLE B
TEST OF ADDITIVE ON DIESEL FUEL

| | | | | |
|---|---|---|---|---|
| API Gravity | D-287 | 33.1 | 33.0 | 33.0 |
| Cetane Number | D-613 | 48.5 | 51.1 | 51.2 |
| Aniline point ° F | D-611 | 146.0 | 146.0 | 146.0 |
| Surface Tension (Dynes/cm) | D-1331 | 25.23 | 24.95 | 24.60 |
| Diesel Indez | | 48.326 | 48.18 | 48.213 |
| Copper Corrosion | D-130 | 1A | 1A | 1A. |

On the basis of the above tests results, it was decided to use one part additive per 500 parts diesel fuel.

Another test conducted with the catalyzing additives of the present application was made with the internal combustion engines which drive electric plants, of the make General Motors, Model 3150-B-20 with 3–71 engine with the following characteristics:

| | |
|---|---|
| 1200 | R. P. M. |
| 20 | Kw |
| 3 | Phase |
| 220 | Volt |
| 60 | Cycle | installed in the station of the Ministry of Communications at Cerro Chichinautzin, State of Morelos, Mexico, which is at an altitude of 3,239 meters above sea level; the following results were obtained, which were confirmed by the personnel of the said Ministry commissioned at the said station.

Before catalywing the fuel, the consumption of diesel per hour with the plant working under load was 11.4 liters per hour; after catalyzing the fuel and after a week of operation consumption was reduced to 5.7 liters per hour under the same conditions of operation. In addition, the opacity of the exhaust gases was reduced by 20% when the catalyzing additive was used; this corroborates the statement above made that the catalyzing additive of the present application reduces the emission of atmospheric contaminants.

The catalyzing additives were also tested in Automotive Testing Laboratories, Inc., to determine in what way they affect the emissions of combustion engines, as well as the way they increase the efficiency of the fuels; the results given below were obtained upon adding the additives to various fuels in the vehicles indicated.

Fuel: gasoline (winter grade). - Type of vehicle: automobile 1970 Model Gremlin. After 2,230 kilometers of operation. The amount of additive added was in the ratio of 1 part, per 500 parts of gasoline.

| | | |
|---|---|---|
| Emission of HC (Hydrocarbons) | reduced | 1.7 % |
| Emission of CO | reduced | 19.1 % |
| Emission of $NO_x$ | reduced | 19.8 % |
| Emission of $CO_2$ | reduced | 6.9 % |
| Efficiency of the fuel used increased | | 9.4 % |

Fuel: Chevron Unleaded gasoline. - Type of vehicle: Gremlin Model 1974. After 812 kilometers of operation.

| | | |
|---|---|---|
| Emission of HC | reduced | 21.5 % |
| Emission of CO | reduced | 15.5 % |
| Emission of $NO_x$ | reduced | 30.7 % |
| Emission $CO_2$ | reduced | 3.9 % |
| Efficiency of the fuel used increased | | 5.3 % |

The additive for the above runs was formulated by using the ingredients according to following table C in the amounts given to make up a 100 l. volume. The additive "C" specifications of the resulting formulation are given immediately after:

TABLE C

| COMPOUNDS | Catalytic Activator Additive Formulation "G" |
|---|---|
| Solution "N" | For Gasoline 10.4 Kgs. 8 l. containing 2.2 Kg. Napthalene. |
| Diesel fuel No. 2 (Like carrier) | 29 l. |
| Terpene Bicyclic compounds ($C_{10}H_{16}$)Pinene | 9 l. |
| Benzene, Toluene or Xylene ($C_6H_6$) | 15 l. |
| Methyl Ethyl Ketone ($CH_3COC_2H_5$) | 25 l. |
| Liquid Vaseline | 4 l. |
| Aniline ($C_6H_7N$) | 10 l. |
| TOTAL: | 100 l. |

GASOLINE ADDITIVE "G" SPECIFICATIONS

| | |
|---|---|
| Density at 77° F | 0.8550 |
| REF Reactive Indez at 77° F | 1.4812 |
| Viscosity at 77° F SSU | 31 |
| Flash Point ° F | 35.6 |
| Fire Point, ° F | 46.4 |
| Calorific value, BTU/lb | 17159.4 |

| | | |
|---|---|---|
| A) ASH PERCENT (1) | | 0.005 |
| B) ACID NUMBER (2) | | 0.04 |
| C) LEAD (Pb, ppm) (3) | | 0.2 |

(1) BURNED AT 88° C (1472° F)
(2) ACID NUMBER DETERMINED BY ASTM METHOD-ACID NUMBER UNITS ARE MILLIGRAMS KOH PER GRAM.
(3) LEAD DETERMINED BY ATOMIC ABSORPTION SPECTROPHOTOMETRY UNITS ARE PARTS PER MILLION (ppm).

TEST OF ADDITIVE ON GASOLINE TEXACO REGULAR LEAD
(Ratio one part additive "G" per 500 parts gasoline)

| Name | Method | Base | Base + Additive on Gasoline |
|---|---|---|---|
| ISD mg/100 ml | | 1.1 | 0.3 |
| +RON | D-2699 | 93.2 | 93.2 |
| ++MON | D-2700 | 87.0 | 87.1 |
| Ox Stability (min) | D-525 | 2650 | 2880 |
| Copper Corr. | D-130 | 1A | 1A |

+(Research Octane No.)++(Motor Octane No.)

TEXACO NO LEAD

| Name | Method | Base | Base + Additive on Gasoline |
|---|---|---|---|
| ISD mg/100 ml | | 1.0 | 0.4 |
| RON | D-2699 | 91.2 | 91.2 |
| MON | D-2700 | 83.7 | 83.7 |
| Ox Stability (min) | D-525 | 2040 | 2555 |
| Copper Corr. | D-130 | 1A | 1A |

Effect of engine fuel catalyzer on exhaust emissions. 5HP single cylinder engine with an electric loading bank. I part of catalyzer was added to 500 parts of regular grade gasoline.

NO LOAD

| | Regular Grade Gasoline | 500:1 R.G. Gasoline & fuel catalyzer |
|---|---|---|
| RPM | 3521 | 3510 |
| Fuel Flow, ml/min | 5 | 5 |
| $CO_2$, % | 12.9 | 12.8 |
| CO, | 3.7 | 1.3 |
| UBH, ppm. | 7500 | 7300 |

HALF LOAD

| | | |
|---|---|---|
| RPM | 3130 | 3011 |
| Fuel Flow, ml/min | 6 | 6 |
| $CO_2$, % | 12.2 | 12.0 |
| CO, % | 4.5 | 2.6 |
| UBH, ppm | 7800 | 7500 |

FULL LOAD

| | | |
|---|---|---|
| RPM | 2940 | 2700 |
| Fuel, Flow, ml/min | 5 | 4 |
| $CO_2$, % | 11.2 | 11.9 |
| CO, % | 6.4 | 3.1 |
| UBH, ppm | 8000 | 7300 |

UBH = Unburned Hydrocarbons.

In the case of fuel oil for boilers the formulation of following table "D" was prepared with the ingredients given so as to make up 100 lts additive with the specifications also given immediately thereafter.

TABLE D

| Compounds | Ratio 1:1000 Catalytic Activator "C" For Boilers |
|---|---|
| Solution "N" | 15 Kgs. 11.5 Containing 3.1 Kgs of Naphthalene |
| Diesel fuel No. 2 (Like carrier) | 43.5 l. |
| Terpene Bicyclic compounds ($C_{10}H_{16}$) Pinene | 9 l. |
| Benzene, ($C_6H_6$) | 18 l. |
| Methyl Ethyl Ketone ($CH_3COC_2H_5$) | 18 l. |
| TOTAL: | 100 l. |

RESIDUAL ADDITIVE FORMULATION SPECIFICATIONS

| | |
|---|---|
| 0.8620 | 0.8260 |
| REF REACTIVE INDEX AT 77° F | 1.4922 |
| VISCOSITY AT 77° F SSU | 31 |
| FLASH POINT ° F | 35.6 |
| FIRE POINT, ° F | 46.4 |
| CALORIFIC VALUE, BTU/lb. | 17843.4 |
| A) Ash percent (1) | 0.005 |
| B) Acid Number (2) | 0.05 |
| C) Lead (Pb,ppm) (3) | 0.4 |

1) Burned at 800° C (1472° F)
2) Acid number determined by ASTM Method-Acid number units are milligrams KOH per gram.
3) Lead determined by atomic Absorption spectrophotometry units are parts per million (ppm)

INFLUENCE OF ADDITIVE CATALYSER WITH BOILER FUEL

| | Surface tension dynes/cm | Viscosity to 25° C | | |
|---|---|---|---|---|
| | | $cps^{(a)}$ | $cstk^{(a)}$ | Saybolt$^{(c)}$ |
| Boiler fuel | 32.1 ± 0.1 | 816 | 889 / 892 / 887 | 4120 |
| Boiler fuel, plus additive 1/5000 | 31.9 ± 0.0 | 800 | 871 / 875 | 4034 |
| 1/2500 | 31.4 ± 0.0 | 720 | 866 / 780 / 787 / 784 | 3631 |
| 1/1000 | 31.2 ± 0.0 | 710 | 774 / 776 / 778 | 3591 |

$^{a)}$Centipoises
$^{b)}$Centistokes
$^{c)}$Saybolt Universal Seconds

From the above it was decided that the additive should be added in a 1/1000 ratio.

The quantities indicated in the foregoing description have been found to be the most suitable, although the invention is not restricted exclusively thereto.

Indeed the formulations can be varied in accordance with the ranges given for each of the ingredients according to the following Table E, which summarizes the data of tables F, H and I where the fourth and fifth components refer to more than one aromatic hydrocarbon and to more than one aliphatic ketone respectively:

TABLE E

Compound per volume percentage except for Naphthalene that is also given i Kg. of solution "N" disclosed below.

| Compounds. | Ratio 1:1000 Catalytic Activator "C" For Boilers | | Ratio 1:500 Catalytic Activator "C" For diesel | | Ratio 1:500 Catalytic Activator "C" For Gasoline | |
|---|---|---|---|---|---|---|
| 1) Naphthalene in Flakes in solution "N"($C_{10}H_8$) | | | | | | |
| a) By weight | 10 | to 15 Kg. | 10 | to 13 Kg. | 10 | to 13 Kg. |
| b) By volume i.e. | 8 | to 11.5 l. | 8 | to 10 l. | 8 | to 10 l. |
| weight of naphtalene | 2.2 | to 3.1 Kg. | 2.2 | to 2.75 Kg. | 2.2 | to 2.75 Kg. |
| 2) Diesel Fuel No.2 (Like carrier) | 47 | to 21.5 l. | 10 | to 6.5 l. | 10 | to 6.5 l. |
| 3) Terpene Bicyclic Compounds ($C_{10}H_{16}$) pinene | 9 | to 18 l. | 6 | to 20 l. | 6 | to 14 l. |
| 4) Benzene,Toluene or Xylene ($C_6H_6$)-($C_7H_8$) ($C_8H_{10}$) | 18 | to 25 l. | 12 | to 18 l. | 12 | to 20 l. |
| 5) Methyl Ethyl Ketone ($CH_3COC_2H_5$)or Acetone ($CH_3COCH_3$) | 18 | to 25 l. | 12 | to 18 l. | 12 | to 20 l. |
| 6) Liquid Vaseline | | | 7 | to 12.5 l. | 5 | to 16 l. |
| 7) Aniline ($C_6H_7N$) | | | | | 7 | to 13.5 l. |
| 8) Nitrobenzene ($C_6H_5NO_2$) | | | 5 | to 15 l. | | |
| TOTAL VOLUME | 100 | 100 | 100 | 100 | 100 | 100 |

Solution "N" = $\frac{15 \text{ Kg. Naphthalene}}{43 \text{ l. Diesel No. 2}}$ Amounting to 55 l. Vol.

In Table E column a) and b) means that the ingredients are mixed in the amounts given in each column, thus covering the lower range for the value under a) and the upper ranges given under b), in addition it should be understood that the ratio given at the top of each column means that the additive is added to the respective fuel in the ratio given in each case regardless of whether under column a) or column b).

TABLE E

Compound per volume percentage except for naphthalene that is also given in Kg. of solution "N" disclosed below.

| Compound for: | Ratio 1:1000 Catalytic Activator "C" Boilers (A) (b) | Ratio 1:500 Catalytic Activator "C" Diesel (a) (b) | Ratio 1:500 Catalytic Activator "C" Gasoline (a) (b) |
|---|---|---|---|
| 1) Naphthalene in flakes in solution "N" ($C_{10}H_8$) | | | |
| a) By weight | 10 to 15 Kg | 10 to 13 Kg. | 10 to 13 Kg. |
| b) By volume | 8 to 11.5 l. | 8 to 10 l. | 8 to 10 l. |
| c) e.i. Weight of Naphthalene | 2.2 to 3.1 Kg | 2.2 to 2.75 Kg. | 2.2 to 2.75 Kg. |
| 2) Diesel fuel No. 2 (like carrier) | 47 to 21.5 l. | 50 to 6.5 l | 50 to 6.5 l. |
| 3) Terpene Bicyclic compounds ($C_{10}H_{16}$) pinene | 9 to 18 l. | 6. to 20 l. | 6 to 14 l. |
| 4) Benzene ($C_6H_6$) | 18 to 25 l. | 12 to 18 l. | 12 to 20 l. |
| 5) Methyl Ethyl Ketone ($CH_3CCO_2H_5$) | 18 to 25 l. | 12 to 18 l. | 12 to 20 l. |

TABLE H

Compounds per volume percentage except for Naphthalene that is also given in Kg of solution "N" disclosed below.

| ompounds | Ratio 1:1000 Catalytic Activator "C" For Boilers (a) (b) | Ratio 1:500 Catalytic Activator "C" For diesel (a) (b) | Ratio 1:500 Catalytic Activator "C" For gasoline (a) (b) |
|---|---|---|---|
| 1) Naphthalene in flakes in solution "N" ($C_{10}H_8$) | | | |
| a) by weight | 10 to 15 Kg. | 10 to 13 Kg. | 10 to 13 Kg. |
| b) by volume | 8 to 11.5 l. | 8.0 to 10 Kg. | 8.0 to 10 l. |
| c) I.E. Weight of Naphthalene | 2.2 to 3.1 Kg. | 2.2 to 2.75 Kg. | 2.2 to .75 Kg. |
| 2) Diesel fuel No. 2 (Like carrier) | 47 to 21.5 Lt. | 50 to 6.5 Lt. | 50 to 6.5 Lt. |
| 3) Terpene Bicyclic Compounds ($C_{10}H_{16}$) Pinene | 9 to 18 l. | 6 to 20 l. | 6 to 14 l. |
| 4) Toluene | 18 to 25 l. | 12 to 18 l. | 12 to 20 l. |
| 5) Methyl Ethyl Ketone ($CH_3COC_2H_5$) | 18 to 25 l. | 12 to 18 l. | 12 to 20 l. |
| 6) Liquid vaseline | | 7 to 12.5 l. | 5 to 16 l. |
| 7) Aniline ($C_6H_7H$) | | | 7 to 13.5 l. |
| 8) Nitrobenzene ($C_6H_5NO_2$) | | 5 to 15 l. | |
| Total volume | 100  100 | 100  100 | 100  100 |

| Compounds | Ratio 1:1000 Catalytic Activator "C" For boilers (a) (b) | Ratio 1:500 Catalytic Activator "C" For diesel (a) (b) | Ratio 1:500 Catalytic Activator "C" For gasoline (a) (b) |
|---|---|---|---|
| 6) Liquid Vaseline | — | 7 to 12.5 lts | 5 to 16 l. |
| 7) Aniline ($C_6H_7N$) | — | — | 7 to 13.5 l. |
| 8) Nitrobenzene ($C_6H_5NO_2$) | — | 5 to 15 l. | — |
| Total volume | 100  100 | 100  100 | 100  100 |

Solution "N" = $\dfrac{15 \text{ kg Naphthalene}}{43 \text{ l. diesel No. 2}}$ Amounting to a 55 l. volume Solution "N" = $\dfrac{15 \text{ Kg. Naphthalene}}{43 \text{ Lt. Diesel No. 2}}$ Amounting to 55 Lt. volume

TABLE I

Compounds per volume percentage except for Naphthalene that is also given in Kg. of solution "N" disclosed below.

| Compounds | Ratio 1:1000 Catalytic Activator "C" For boilers | | Ratio 1:500 Catalytic Activator "C" For diesel | | Ratio 1:500 Catalytic Activator "C" For gasoline | |
|---|---|---|---|---|---|---|
| 1) Naphthalene in flakes in solution "N" ($C_{10}H_8$) | | | | | | |
|   a) by weight | 10 | to 15 Kg. | 10 | to 13 Kg. | 10 | to 13 Kg. |
|   b) by volume | 8 | to 11.5 l. | 8 | to 10 l. | 8 | to 10 l. |
|   c) i.e. weight of Naphthalene | 2.2 | to 3.1 Kg | 2.2 | to 2.75 | 2.2 | to 2.75 |
| 2) Diesel fuel No. 2 (Like carrier) | 47 | to 21.5 l | 50 | to 6.5 l | 50 | to 6.5 l. |
| 3) Terpene Bicyclic Compounds ($C_{10}H_{16}$) Pinene | 9 | to 18 l. | 6 | to 20 l. | 6 | to 14 l. |
| 4) Xylene ($C_8H_{10}$) | 18 | to 25 l. | 12 | to 18 l. | 12 | to 20 l. |
| 5) Acetone ($CH_3COCH_3$) | 18 | to 25 l. | 12 | to 18 l. | 12 | to 20 l. |
| 6) Liquid Vaseline | | | 7 | to 12.5 l | 5 | to 16 l. |
| 7) Anyline ($C_6H_7N$) | | | | | 7 | to 13.5 l. |
| 8) Nitrobenzene ($C_6H_5NO_2$) | | | 5 | to 15 l. | | |
| Total volume | 100 | 100 | 100 | 100 | 100 | 100 |

Solution "N" = $\frac{15 \text{ Kg. Naphthalene}}{53 \text{ Lt. diesel No. 2}}$ Amounting to a 55 Lt. volume The method of preparation of the catalyzing additives is characterized by pouring into a metallic container at ordinary temperature and pressure from 1 to 50% of the aromatic hydrocarbon and one third of the total quantity of hydrocarbon diluent, mixing and mechanically stirring in order to complete homogenization. In another container which is at ordinary temperature and pressure pour and mix by mechanical stirring from 0 to 40% of the crude oleoresinous juice containing terpenes and from 3 to 55% of the organic solvents and co-solvents of aromatic hydrocarbon type or those with oxygenated functions of the formulas R—COR', R—OH, R'—COOR in which R and R' contains $C_1$ to $C_8$ chains until the oleoresinous juice is dissolved. The product obtained from this step is perfectly filtered and poured into a third container, mixing it with the solution obtained in the first step, by means of mechanical stirring for a period of 15 to 30 minutes, adding the rest of the hydrocarbon diluent in small portions until its perfect homogenization is obtained; to this product are added from 1 to 20% of paraffinic hydrocarbons, and from 2 to 15% of the aliphatic alcohol type solvent and the solution is vigorously stirred, allowed to settle for an hour and the accumulated water is decanted; finally to this product are added 2 to 15% of nitrogen containing compounds; the mixture is stirred, and filtered and the product is bottled.

I claim:

1. A petroleum derived fuel composition of improved efficiency comprising:
  a) a basic fuel selected from the group comprising fuel oil, diesel oil and gasoline, and
  b) an additive composition comprising a mixture of aromatic hydrocarbons with up to two methyl groups, lower alkyl aliphatic ketones, and bicyclic terpene compounds of the formula $C_{10}H_{16}$, said additive composition being present in a microvolumetric concentration between 1/500 and 1/5000 by volume of the basic fuel.

2. A fuel composition according to claim 1 in which the additive composition includes naphthalene.

3. A fuel composition according to claim 1 in which the additive composition includes a compound selected from the group comprising nitro-benzene and aniline.

4. A fuel composition according to claim 1 in which the additive composition includes liquid vaseline.

5. A fuel composition according to claim 1 in which the additive composition includes a hydrocarbon diluent or carrier.

6. A fuel composition according to claim 1 comprising:
  a) fuel oil, and
  b) an additive composition comprising by volume:

| | |
|---|---|
| benzene | 18 to 25% |
| methyl ethyl ketone | 18 to 25% |
| pinene | 9 to 18% |
| naphthalene | 8 to 11.5% |
| diesel oil (carrier) | 47 to 21.5% | said additive composition being present in a microvolumetric concentration of 1/1000 by volume of the basic fuel oil.

7. A fuel composition according to claim 1 comprising:
  a) diesel oil, and
  b) an additive composition comprising by volume:

| | |
|---|---|
| benzene | 12 to 18% |
| methyl ethyl ketone | 12 to 18% |
| pinene | 6 to 20% |
| naphthalene | 8 to 10% |
| liquid vaseline | 7 to 12.5% |
| nitro-benzene | 5 to 15% |
| diesel oil (carrier) | 50 to 6.5% | said additive composition being present in the microvolumetric concentration of 1/500 by volume of the basic diesel oil.

8. A fuel composition according to claim 1 comprising:
 a) gasoline, and
 b) an additive composition comprising by volume:

| | |
|---|---|
| benzene | 12 to 20% |
| methyl ethyl ketone | 12 to 20% |
| pinene | 6 to 14% |
| liquid vaseline | 5 to 16% |
| aniline | 7 to 13.5% |
| diesel oil (carrier) | 50 to 6.5% | said additive composition being present in the microvolumetric concentration of 1/500 by volume of the basic gasoline.

* * * * *